(No Model.)
W. C. COWEN.
CAR COUPLING.
No. 334,751. Patented Jan. 26, 1886.
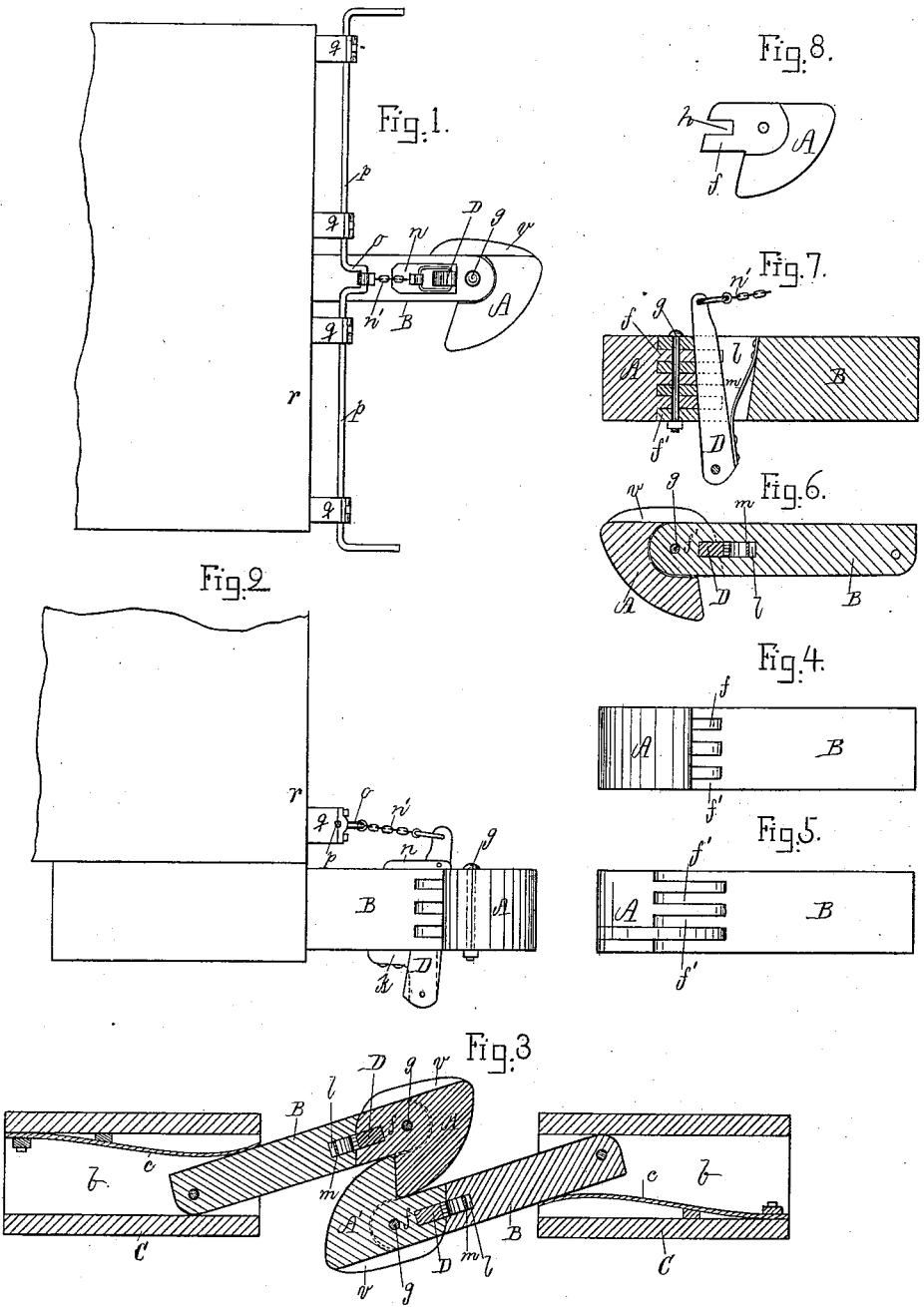
Witnesses.
S. N. Piper
Ernest B. Pratt
Inventor.
Wm. C. Cowen.
by R. H. Eddy atty

UNITED STATES PATENT OFFICE.

WILLIAM CHARLES COWEN, OF HYDE PARK, MASSACHUSETTS.

CAR-COUPLING.

SPECIFICATION forming part of Letters Patent No. 334,751, dated January 26, 1886.

Application filed July 13, 1885. Serial No. 171,488. (No model.)

*To all whom it may concern:*

Be it known that I, WILLIAM CHARLES COWEN, of Hyde Park, in the county of Norfolk, of the Commonwealth of Massachusetts, have invented a new and useful Improvement in Railway-Car Couplings; and I do hereby declare the same to be described in the following specification and represented in the accompanying drawings, of which—

Figure 1 is a top view, Fig. 2 a side elevation, and Fig. 3 a horizontal section, of a car-coupling containing my invention, the nature of which is defined in the claims hereinafter presented. Fig. 4 is an inner side view, Fig. 5 an outer side view, Fig. 6 a horizontal section, and Fig. 7 a vertical and longitudinal section, of one of the coupling-hooks and its swing-bar. Fig. 8 is a top view of one of the movable hooks, to be described.

In such drawings, A and A' denote two coupling-hooks, each of which is hinged to one of two bars, B, extending within and outwardly from two draw-bars, C. Each bar B, at or near its rear end, is pivoted to its draw-bar in a manner to enable the said bar B to be swung laterally within the chamber $b$ of the said draw-bar. There is fixed to each draw-bar in its chamber a spring, $c$, to bear against the bar B. Each hook A or A', formed as represented, is separate from and hinged to its bar B, the several shank portions $f$ of the hook being extended between like shank portions, $f'$, projecting from the bar. These shank portions are connected by a joint-pin, $g$, going down through them. The shank portions $f$ project in rear of their joint-pin, and each is notched at its end, in manner as shown at $h$, to receive, when such shank portion is in range with the bar B, a swing latch or arm, D, that, pivoted to the bar or an ear, $k$, projecting down from it, extends upward through and above the bar in a slot, $l$, made therein. Within the slot is a spring, $m$, for advancing the locking-arm D. To the said locking-arm D, or part thereof projecting above the bar, there is pivoted a slide, $n$, that covers the upper end of the slot $l$ when the arm is in an advanced position. The slide, by covering the top of the slot, keeps such slot clear of dust or matters liable to fall into the slot, and thereby obstruct the working of the latching-arm or its spring. The lowest shank portion of the hook projects, as shown at $v$, beyond the hook, and is formed as a cam to hold the arm D in a retracted position while the shank portions $f$ are out of range with the bar. There is fastened to the upper part of the arm D a chain, $n'$, connected to a double crank, $o$, projecting from a rock-shaft, $p$, fulcrumed to brackets $q$, extending from the next adjacent end, $r$, of the car. To such shaft there are to be cranks, or means of turning it, either by a person at one side of or on top of the car, in order to effect the retraction of the locking-arm.

In coupling two cars, one is to be moved toward the other, so as to carry the hook of the first into contact with and cause it to pass by that of the other, in which case both coupling-bars will be moved aside, to allow each hook to pass by the other and couple with it.

To effect the uncoupling of the hooks, the locking-arm of one of them should be retracted out of engagement with its hook. On one of the cars being moved away from the other the unlatched hook will turn out of engagement with the latched hook.

I do not claim a car-coupling constructed as represented in the United States Patent No. 275,717. Nor do I claim car-couplings made as represented in the United States Patents Nos. 138,405 and 185,269, in neither of which is the turning hook constructed with notches in its shank portion or portions to receive a locking-arm, nor has either of such portions a cam projecting from it, as and for the purpose hereinbefore described.

I claim—

1. Each of the hooks A and A', having notches in its shank portions, in combination with its carrying-bar B, provided with the locking-arm D, and its actuating-spring arranged in a slot in such bar and pivoted to the bar so as to operate with such notches, as set forth.

2. The combination of the cam $v$, projecting from the shank of the hook, with such hook and its carrying-bar, and with the locking-arm D and its spring, adapted, as represented, to the said bar, the shank of the hook being notched to receive the locking-arm, and all being substantially as set forth.

WILLIAM CHARLES COWEN.

Witnesses:
R. H. EDDY,
ERNEST B. PRATT.